United States Patent Office 3,364,873
Patented Jan. 23, 1968

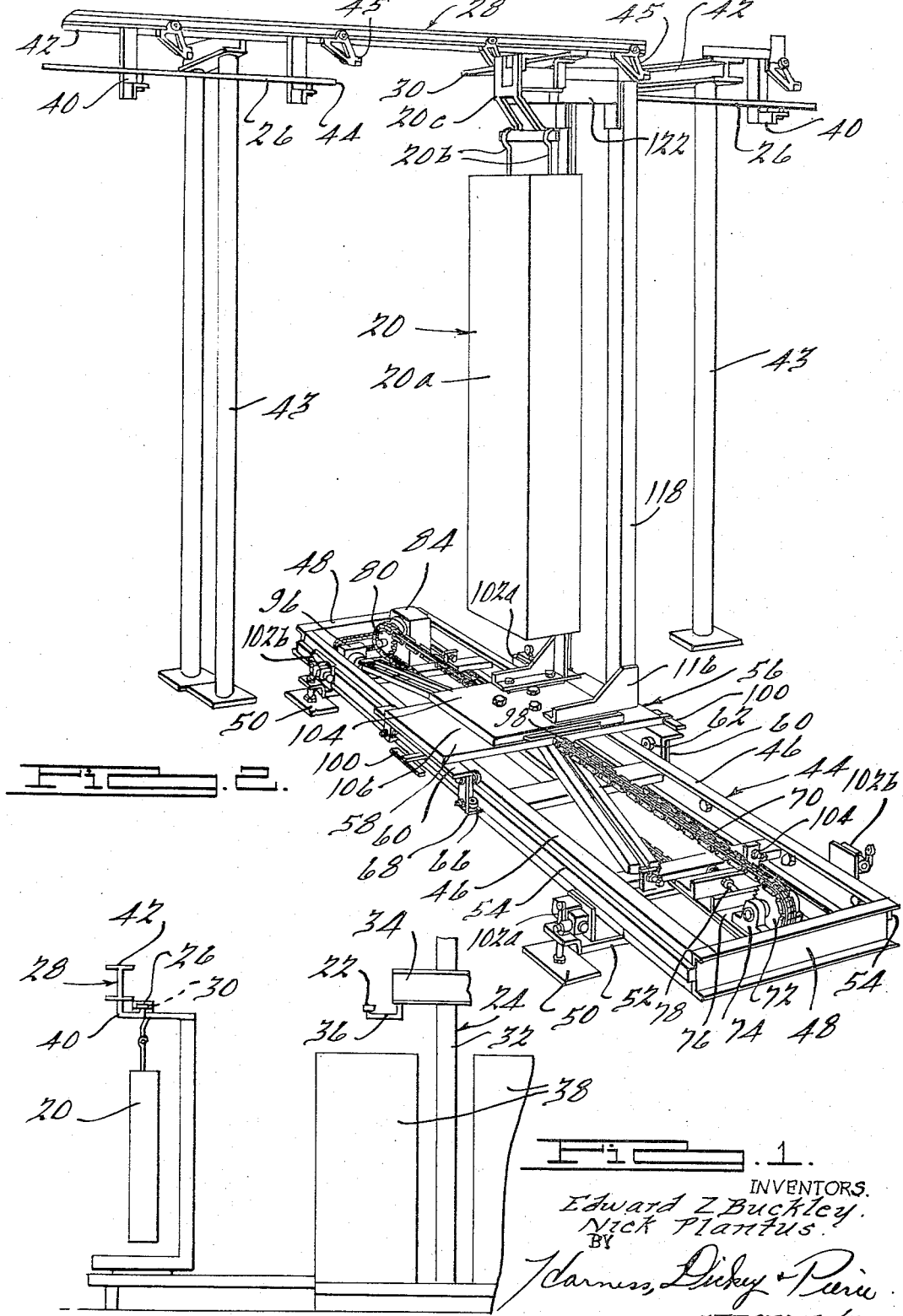

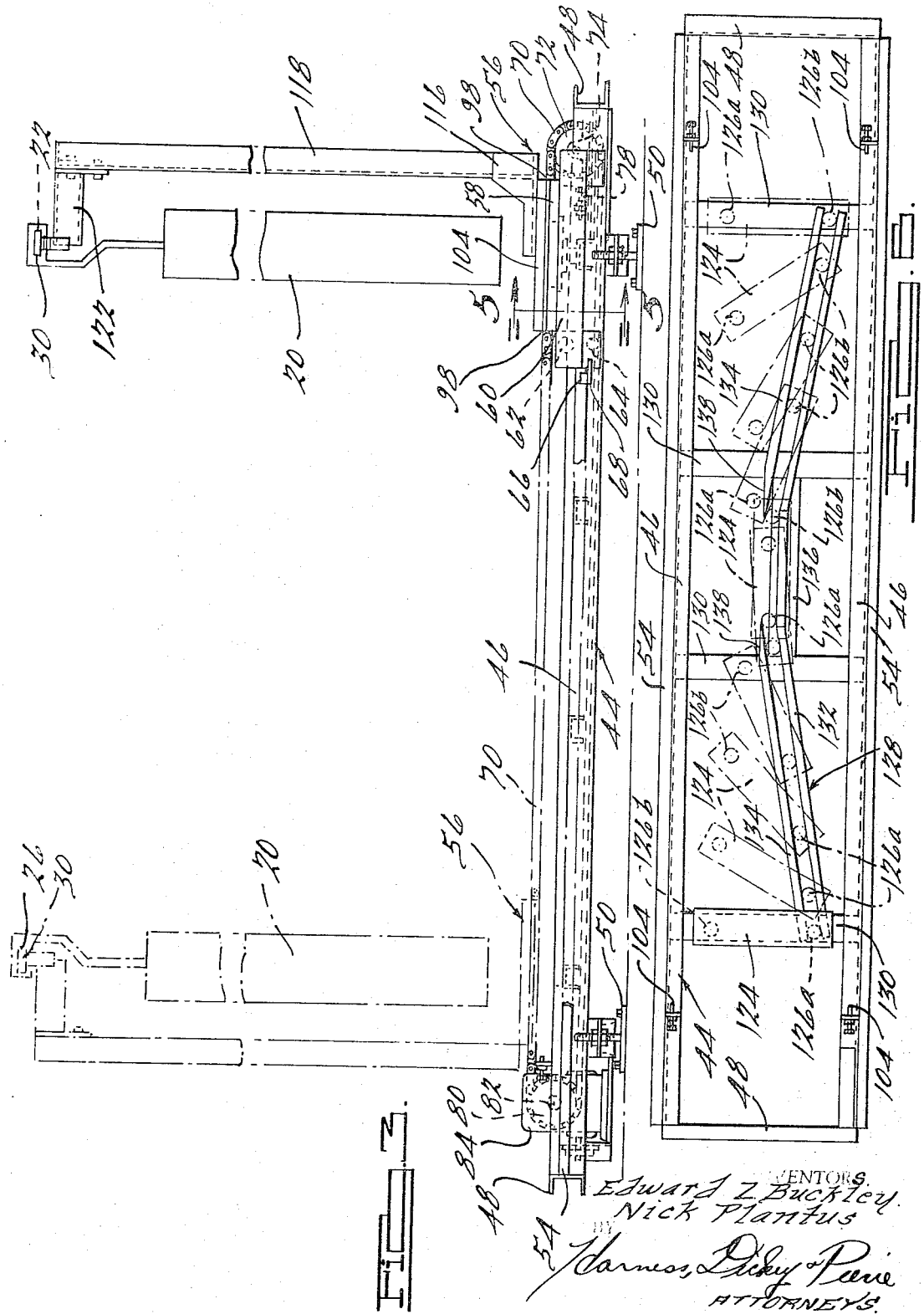

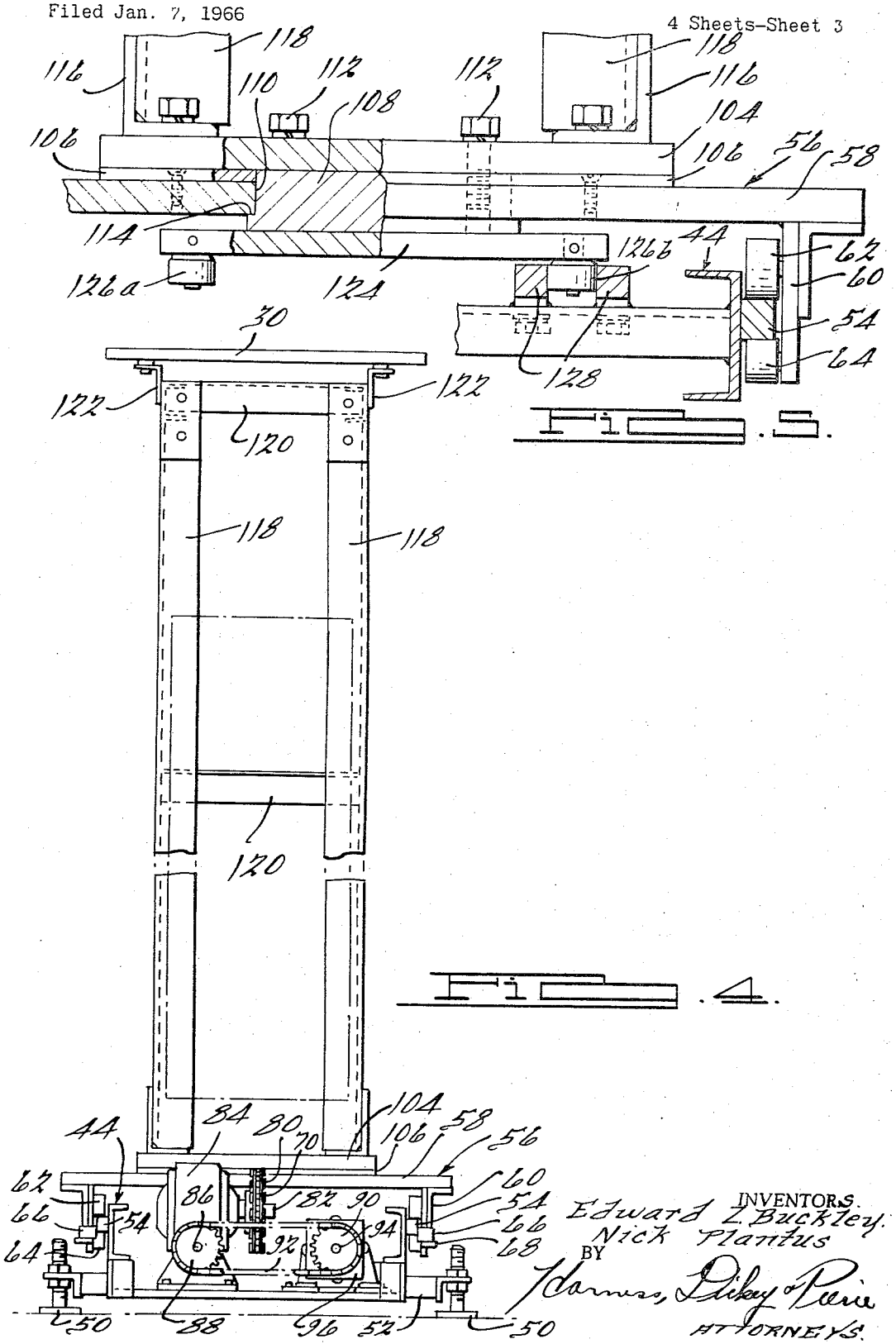

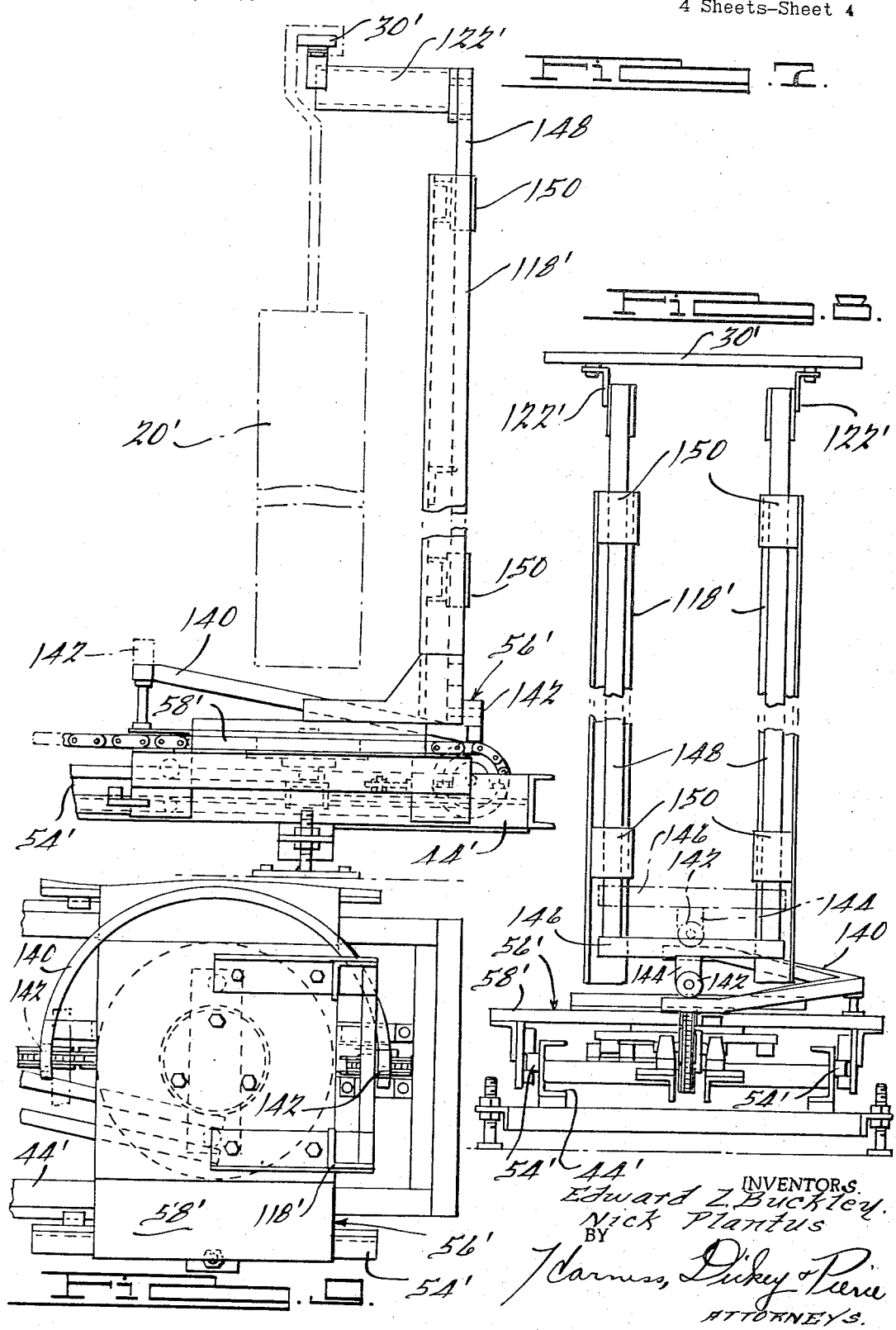

3,364,873
WORK TRANSFER MECHANISM
Edward Z. Buckley, Livonia, and Nick Plantus, Detroit, Mich., assignors to The Udylite Corporation, Warren, Mich., a corporation of Delaware
Filed Jan. 7, 1966, Ser. No. 519,388
10 Claims. (Cl. 104—96)

ABSTRACT OF THE DISCLOSURE

A work transfer device for transporting workpieces between two stations including a carriage mounted for travel between the stations incorporating workpiece supporting means thereon, which is automatically rotatable through a preselected angularity in response to the travel of the carriage for aligning the workpieces thereon with the workpiece receiving devices at each work station.

---

The present invention broadly relates to work transfer mechanisms and more particularly to transfer devices of the type for use in transferring work racks between two spaced stations. More specifically, the present invention is directed to an improved work transfer mechanism for use in automatically transferring work racks between two intermittently moving conveyors or sections thereof.

A variety of work transfer devices of the general type to which the present invention is applicable are in widespread commercial use for transferring work racks between spaced stations and particularly for the automatic loading and unloading of conveying apparatus. Work transfer devices of the foregoing type are particularly suitable for use in combination with automatic electroplating machines or the like, for transferring work racks incorporating one or a plurality of workpieces thereon to and from a shop conveyor and a plating machine.

Work transfer devices of the types heretofore known, have been deficient in one or more aspects to provide a simple, automatic and coordinated operation of the transfer mechanism and the conveying apparatuses between which the work racks are transferred. In particular, work transfer devices of the types previously known, have necessitated relatively complex structures to achieve a coordinated movement of the work racks between two spaced stations such as, for example, two intermittent conveyor mechanisms and, moreover, have required relatively complex work rack configurations for engaging the supporting rails of the two conveyor apparatuses and the engaging means of the work transfer device itself. For example, work racks conventionally are formed with a hook-shaped portion for slidably engaging a supporting rail on an automatic or semi-automatic plating machine whereby the construction not only affords support of the work rack on the rail but also a transfer of electrical energy to the work rack and workpieces supported thereon through electrified sections of the supporting rail at such stations at which an electroplating operation is to be performed. During the transfer of such work racks from the plating machine to a shop conveyor, for example, spaced laterally of the machine, it has been necessary to provide auxiliary engaging means on the work rack in order to engage the supporting rail of the auxiliary conveyor. Alternatively, it has been found necessary to provide a reversal in the means for supporting the rail of the auxiliary conveyor or plating machine in order to enable unobstructed transfer of the work rack from one machine to the other.

It will be apparent from the foregoing, that there has been a long felt heretofore unfilled need for a simple, compact and efficient work transfer device which is adaptable for transferring work racks between two conveyor systems enabling the use of a simple work rack construction and the addition of further conveyor systems as the need arises without necessitating complex design innovations in such additional conveying systems to accommodate the work racks to be transferred thereto.

It is, accordingly, a principal object of the present invention to provide an improved work transfer mechanism which overcomes many of the problems and disadvantages associated with transfer devices of similar type heretofore known.

Another object of the present invention is to provide an improved work transfer device which employs a unitary drive mechanism for effecting concurrent longitudinal travel of the transfer carriage and angular rotation of the work rack supporting means thereon enabling thereby the use of a simple work rack construction and a standardization of supporting rails of the conveyor systems serviced thereby.

Still another object of the present invention is to provide an improved transfer mechanism employing a unitary drive mechanism for effecting concurrent longitudinal travel of the transfer carriage between two spaced stations and a rotation and controlled vertical movement of the work rack supporting device in response to the travel of the carriage providing therewith increased simplicity in the coordination and alignment of the transfer mechanism between two or more spaced conveyor systems.

A further object of the present invention is to provide an improved transfer mechanism which, through a single power source, is effective to convey a work rack between two spaced stations while concurrently rotating the work rack about an upright axis through a prescribed angularity and vertically moving the work rack through a preselected vertical increment thereby achieving appropriate alignment between the work rack and the supporting means at two spaced conveyor systems.

Still a further object of the present invention is to provide an improved work transfer device which through its combined rotational and vertical movements substantially facilitates the layout of multiple conveyor systems serviced thereby enabling a substantial improvement in the efficient and effective utilization of plant facilities and equipment.

Yet still another object of the present invention is to provide an improved work transfer device which is of simple design, of durable construction, of simple and versatile operation, and of economical manufacture and use.

The foregoing and other objects and advantages of the present invention are achieved by a work transfer mechanism including a frame on which a carriage is movably and guidably mounted for travel between two spaced stations such as, for example, two spaced continuous or intermittently moving conveyors. Unitary drive means are incorporated for moving the carriage between the two spaced stations in coordination with the intermittent or continuous operation of the two conveyors. Cooperating means are provided between a work rack supporting device mounted on the carriage and movable therewith and on the frame of the transfer mechanism which is effective to provide a controlled rotation of the work rack supporting means in response to the travel of the carriage between the stations from one position when disposed at one station to a second position angularly spaced from the first position when disposed at the other station thereby assuring appropriate alignment of the work rack with the supporting rails of the two spaced conveyors. In addition, it is further contemplated, in accordance with a second embodiment of the present invention, that the work rack supporting means can be movably and guidably supported on the carriage such that a controlled vertical movement of the work rack supporting means on the carriage is achieved concurrently with the rotation of the supporting means in response to the travel of the carriage thereby permitting compensation of differences in the elevation of the work rack receiving means at the two stations.

Additional objects, features and advantages of the present invention will become apparent from a reading of the specification, taken in conjunction with the accompanying drawings, wherein:

FIGURE 1 is a schematic side elevational view illustrating a typical arrangement of the work transfer mechanism comprising the present invention disposed between an automatic electroplating machine and a shop conveyor spaced laterally therefrom:

FIGURE 2 is a perspective view illustrating the work transfer mechanism with the carriage thereof disposed at a point intermediate its travel between a shop conveyor at one side and the automatic machine at the other side;

FIGURE 3 is an enlarged side elevational view of the work transfer mechanism shown in FIGURE 2;

FIGURE 4 is an end elevational view of the left end of the transfer mechanism illustrated in FIGURE 3;

FIGURE 5 is a vertical sectional view taken through the carriage assembly as shown in FIGURE 3 and taken along the line 5—5 thereof;

FIGURE 6 is a plan view of the frame of the transfer mechanism with the carriage removed for the purposes of clarity and illustrating the arrangement of the cam track extending along the machine frame and the relative dispositions of the cam follower assembly at different locations of the carriage along the frame;

FIGURE 7 is a fragmentary side elevational view of a work transfer mechanism incorporating therein an additional embodiment for effecting controlled vertical movement of the work rack engaging means on the carriage assembly in response to rotation of the work rack supporting means;

FIGURE 8 is an end elevational view of the right end of the work transfer mechanism shown in FIGURE 7, and FIGURE 9 is a fragmentary plan view of the ramp on the work carriage assembly as shown in FIGURES 7 and 8.

Referring now in detail to the drawings and as may be best seen in FIGURES 1 and 2, a typical arrangement of the work transfer mechanism is illustrated wherein its operation is intended to transfer a work rack indicated at 20 between a rail 22 on an automatic conveying machine indicated at 24 to a supporting rail 26, of a suitable shop conveyor 28. In the exemplary embodiment shown, the work transfer mechanism incorporates a rail segment 30 on which the work rack 20 is supported and which rail segment is adapted to be disposed in alignment with one end of the supporting rail 26 of the shop conveyor when disposed at one station and in alignment with one end of the rail 22 of the conveying machine when disposed at the other station. In accordance with this arrangement, a work rack is transferred to the rail segment on which the work rack is carried by the transfer mechanism to the other station and thereafter is transferred off the rail segment to the other supporting rail. Similarly, a new work rack may be transferred to the rail segment which in turn is transferred by means of the transfer mechanism back to the other supporting rail. In this arrangement, the work transfer mechanism operates as a loader-unloader mechanism between an automatic conveying machine and a shop conveyor supplying work racks thereto.

The conveying machine 24 illustrated schematically in FIGURE 1, may be of any of the types well known in the art such as disclosed in United States Patent No. Re. 24,072, granted on Oct. 11, 1955, for "Pusher Type Automatic Plating Apparatus" and assigned to the same assignee as the present invention. Reference to the foregoing patent is made for a more detailed description of the machine which is not essential for an understanding of the present invention. Typically, the conveying machine 24 comprises a frame including a series of upright columns 32 on which an elevator chassis 34 is movably mounted for movement to and from a lowered position, as illustrated in FIGURE 1, to a raised position vertically spaced therefrom. The rail 22 is mounted on the elevator chassis 34 by means of a series of outriggers 36 on which the work racks are slidably supported and are transferred through a series of treating receptacles such as the tanks 38. The elevator chassis 34 lifts the work racks mounted on the rail 22 in order that they can be transferred above the partitions separating adjoining tanks. In the exemplary embodiment illustrated, the rail 22 is provided with a suitable gap into which the rail segment 30 on the work transfer mechanism is disposed when at the station with the ends of the rail segment in end-to-end alignment with the rail 22 whereupon work racks are transferred on and off the rail segment in accordance with the specific loading or unloading operation to be performed.

The shop conveyor 28, as illustrated in FIGURE 1, and as more clearly shown in FIGURE 2, may comprise any suitable conveyor system wherein the supporting rail 26 is similarly supported at spaced intervals by outriggers 40 connected to a longitudinally extending support beam 42, which may suitably be supported by a series of longitudinally spaced columns 43 or, alternatively, suspended from an overhead supporting structure. In either event, in the exemplary arrangement shown, the supporting rail 26 of the shop conveyor is provided with a suitable gap indicated at 44 in FIGURE 2, into which the rail segment 30 of the transfer mechanism is adapted to fit in end-to-end alignment to enable work racks to be transferred on and off the rail segment consistent with the specific loading or unloading operation to be performed. Suitable transfer means are included in the shop conveyor such as a reciprocable pusher mechanism including pushers 45 adapted to engage and intermittently advance the work racks along the rail 26.

It will be appreciated by those skilled in the art that the transfer mechanism comprising the present invention, is equally applicable for transferring work racks between two shop conveyors, between two automatic conveying machines or between any two spaced work stations consistent with the specific operation to be performed. In addition, one or a plurality of work racks can be simultaneously transferred from one conveyor to the other and the mechanism can operate as a loader, an unloader as well as both a loader and unloader. In the combined loader-unloader function, movement of the transfer mechanism from the plating machine 24 to the shop conveyor 28, effects transfer of a work rack incorporating workpieces thereon which has completed a prescribed treating sequence to the shop conveyor. On its return movement from the shop conveyor to the plating machine, a work rack incorporating unprocessed workpieces, is transferred or loaded on the conveying machine to undergo the prescribed treating sequence. It will be further understood by those skilled in the art that the specific configuration of the rail means on the conveyor systems, and of the rail segment on the work transfer mechanism can be varied to provide optimum retention of the specific work racks employed without detracting from the benefits achieved by the transfer mechanism comprising the present invention.

The transfer mechanism, in accordance with one embodiment of the present invention, will now be described with particular reference to FIGURES 2–6. As shown in the drawings, the transfer mechanism comprises a frame 44 of a rectangular configuration including longitudinally extending side members 46 and end members 48. The frame 44 is adapted to be positioned on the floor or ground by means of vertically adjustable pads 50 affixed to each end of a pair of cross members 52 extending transversely beneath the frame 44 and rigidly affixed thereto.

As best seen in FIGURE 4, the side members 46 of the frame 44 are of a channel-shaped cross section to the exterior surfaces of which a rail 54 is welded or otherwise rigidly affixed and extends for substantially the entire length thereof. A carriage 56 is movably and guidably mounted on the rails 54 for travel therealong to and from one station adjacent to one end thereof to a second station longitudinally spaced therefrom. It will be understood by those skilled in the art that while the frame 44 and the rails 54 affixed thereto are shown to be straight in the exemplary embodiments illustrated in the drawings, all or portions of the frame and rails can be provided with an arcuate contour to provide for appropriate straight or arcuate travel of the carriage between the two spaced stations as may be desired.

The carriage 56, as best seen in FIGURES 3, 4 and 5, comprises a platform 58 of a generally rectangular configuration which extends transversely of the side members 46. A side bracket 60 is affixed to the lower surface of each side of the platform 58. A pair of upper rollers 62 are affixed to the inner surfaces of each of the side brackets 60 and are adapted to be disposed in rolling bearing contact against the upper surfaces of the rails 54, as best seen in FIGURE 4. Similarly, a pair of lower rollers 64 are affixed to each of the side brackets 60 and are adapted to be disposed in rolling bearing contact against the lower surfaces of the rails 54. Additional guidance and stability of the carriage during its travel along the rails 54 is provided by a pair of side rollers 66 affixed to brackets 68 projecting from each end of the side brackets 60 which are adapted to be disposed in rolling bearing contact against the exterior face surface of the rails 54. The coaction between the upper rollers 62, lower rollers 64, and side rollers 66 with the surfaces of the rails 54 assures stability of the carriage 56 on the frame when positioned at each of the two spaced stations as well as during its travel therebetween.

Movement of the carriage 56 between the two spaced stations such as from the position as shown in solid lines in FIGURE 3 in which the rail segment 30 is disposed in alignment with the rail 22 of the conveying machine to the position as shown in phantom in FIGURE 3, in which the rail segment on the transfer mechanism is disposed in alignment with the rail 26 of the shop conveyor, is achieved in accordance with the exemplary embodiment shown by means of a continuous flexible element such as a roller chain 70 extending longitudinally of and between the side members 46 of the frame. One end of the roller chain 70 is trained about an idler sprocket 72 adjustably mounted on the machine frame between a pair of pillow blocks 74 affixed to a plate 76. The plate 76 is longitudinally adjustably positionable by means of an adjusting screw 78 as best seen in FIGURES 2 and 3 for adjustably tensioning the roller chain. The opposite end of the roller chain is trained about a drive sprocket 80, as best seen in FIGURES 3 and 4, which is affixed to the output shaft 82 of a speed reducer 84 mounted on the frame. The input shaft 86 of the speed reducer 84 is formed with a driven pulley or sprocket 88 which is in turn drivingly coupled to a drive pulley or sprocket 90 by means such as a belt or chain 92. The drive sprocket 90 is affixed to the output shaft 94 of a reversible motor 96 which may be fluid actuated, electrical, or the like. The upper flight of the roller chain 70 is formed with a gap therein and the terminal links of the chain are connected respectively, to ears 98 projecting from opposite sides of the carriage platform 58. It will be apparent from the foregoing arrangement that movement of the roller chain in response to rotation of the drive sprocket 80 as driven by the reversible motor 96 effects a corresponding movement of the carriage 56 along the rails 54.

It will be understood that alternative suitable drive mechanisms such as a rack and pinion drive, a friction wheel drive, or the like, can be satisfactorily employed in lieu of the chain drive mechanism illustrated in the drawings. In accordance with the exemplary arrangement illustrated, the reversible drive motor 96 is of a hydraulic type connected to a hydraulic system incorporating suitable valving of the type well known in the art, whereby the direction and speed of rotation of the reversible motor can be controlled so as to provide appropriate longitudinal travel of the carriage. In accordance with a preferred embodiment of the present invention, the hydraulic system includes suitable valving to provide for two-speed operation of the motor 96 whereupon the speed of translation of the carriage can be modified during the course of its travel between the spaced stations such that a slow down thereof occurs just prior to arriving at the end of its travel. The slowdown in the speed of travel of the carriage provides the advantage of preventing an abrupt deceleration and acceleration thereof which, in some instances, may occasion an undesirable oscillation to the work rack suspended from the work supporting means on the carriage.

For this purpose, and as best seen in FIGURE 2, an actuator 100 is affixed to and projects laterally of each of the side brackets 60 of the carriage, which is adapted to coact with suitable sensing means such as limit switches 102a, 102b as the carriage approaches a station. The limit switches 102a are suitably connected to the central control circuit controlling the flow of hydraulic or other pressurized fluid to the reversible motor 96, whereupon appropriate solenoid valves are actuated during the last portion of travel of the carriage in response to the tripping of limit switch 102a by actuator 100 effecting a reduction in the quantity of fluid flow and a corresponding reduction in the speed of travel of the carriage. Further travel of the carriage at the reduced speed effects the tripping of the second limit switch 102b, which in turn through the central control circuit, effects a closure of the solenoid valve halting the flow of pressurized fluid to the reversible motor and consequently stopping movement of the carriage. In order to prevent any override of the carriage travel due to inertia beyond the position at which the rail segment on the carriage is in alignment with the appropriate rail at the station, a positive stop such as a stop screw 104, as shown in FIGURE 6, is provided which is mounted on the frame at each end thereof and is adapted to coact with the carriage and prevent further movement thereof beyond the preset position.

A work rack supporting assembly is rotatably mounted on the carriage platform 58 and is movable therewith in response to movement of the carriage. The work rack supporting assembly, as best seen in FIGURES 2 through 5, comprises a base 104 having the peripheral portion of the underside thereof disposed in sliding bearing contact against an annular anti-friction washer 106 affixed to the upper surface of the platform 58. A stepped stub shaft 108, shown in FIGURE 5, is rotatably journaled in a bore 110 through the center portion of the platform 58 and is affixed to the base of the work rack supporting assembly by means of screws 112. The stub shaft 108 is formed with a shoulder 114, as best seen in FIGURE 5, which is adapted to underlie and engage the lower edge surface of the platform 58 of the carriage adjacent to the bore 110 preventing unwanted vertical or tilting movement of the work supporting assembly relative to the platform 58.

A pair of horizontally extending legs 116 are rigidly secured to the upper surface of the base 104 to the outer end portions of which upright columns 118 are rigidly secured and are retained in spaced substantially parallel relationship by means of transverse braces 120. A pair of angle iron arms 122 are affixed to and project outwardly of the upper end portions of the upright columns 118, as best seen in FIGURE 3, to the outer end portions of which the rail segment 30 is affixed. As will be noted in accordance with the preferred construction of the work supporting assembly shown in FIGURE 3, the lateral offset of upright columns 118 from the vertical axis of rotation of the work supporting assembly is such as to accommodate the work rack 20 suspended centrally of the rail segment 30 such that upon rotation thereof, a minimum of influence is exerted on the rack due to the centrifugal forces imposed, thereby minimizing swinging movement of the rack during its transport. This is illustrated in FIGURE 2 wherein the carriage 56 is shown in an intermediate position between the ends of the frame and wherein the work supporting assembly has been partly rotated between its respective positions. It will be further noted in FIGURE 2 that the work rack in the exemplary embodiment shown consists of a workpiece 20a formed with hooks 20b at the upper portion thereof for suspending itself from a work carrier 20c formed at its upper end with a hook engaging portion for slidably engaging the rail segment 30.

The rotation of the work supporting assembly, in accordance with the practice of the present invention, is achieved in response to the travel of the carriage between the two spaced stations. This is accomplished in accordance with the exemplary embodiment illustrated in the drawings by means of coacting means on the work rack supporting assembly and on the machine frame which, during at least a portion of the travel of the carriage, is operative to effect a rotation of the work supporting assembly through a prescribed angular movement. As will become apparent, the arrangement provides for rotation without necessitating the use of secondary drive means thereby providing for a substantially simpler structure and one which is mechanically coupled to the longitudinal disposition of the carriage assuring positive and accurate angular positioning of the supporting means relative to the longitudinal disposition of the carriage. The specific angularity of rotation of the work supporting means can be varied consistent with the relative angularity of the supporting rails of the two conveyors disposed at the two spaced stations. In addition, the angularity can be adjusted to compensate for any arcuate travel of the carriage when employing rails which are not straight but incorporate curved portions therealong. In the exemplary embodiment illustrated, the rail 22 of the conveying machine shown in FIGURE 1, is disposed parallel to the supporting rail 26 of the shop conveyor 28 such that an angular movement of 180° is required in order to orient the hook engaging portion on a work carrier in the same relation relative to each rail. It will, of course, be appreciated that when the two rails of adjacent conveyors are not parallel, appropriate modifications can be made in the angularity of rotation of the work supporting means in a manner subsequently to be described.

In the exemplary embodiment illustrated, rotation of the work supporting means is accomplished by means of a roller cam track and rotator assembly, which is best illustrated in FIGURES 5 and 6. As shown in FIGURE 5, a bar 124 is rigidly affixed to the underside of the stub shaft 108 to the end portions of which cam follower rollers 126a, 126b are rotatably mounted. The rollers 126a, 126b are adapted to coact with a cam track 128, as best seen in FIGURES 5 and 6, which extends between the side members 46 of the frame and are supported on a series of transverse braces 130. The cam track 128, as seen in FIGURE 6, comprises a continuous cam rail 132 and a pair of cam rail sections 134 disposed in spaced parallel relationship to the angularly disposed portions of the cam rail 132. The cam rail 132 is formed with an intermediate straight section 136 which is disposed opposite to a gap between the cam rail sections 134 to permit entry and exit of the cam rollers 126a, 126b, respectively. The adjacent ends of the cam rail sections 134 are also formed with a chamfered surface indicated at 138 to provide for clearance and guidance of the cam rollers upon entry and exit from engaging position within the cam track.

The angular rotation of the work supporting assembly during the course of the travel of the carriage between the two spaced stations is best represented by the end positions of the bar 124 and the cam follower rollers 126a, 126b on the ends thereof, as well as during intermediate positions of the travel of the carriage, as shown in phantom in FIGURE 6. Referring to FIGURE 6, and with the carriage disposed at the left end of the transfer device, as viewed in FIGURE 6, the bar 124 is oriented subtantially perpendicular to the path of travel of the carriage and with the cam roller 126a disposed between and in engagement with the cam track 128. Upon subsequent movement of the carriage toward the right, as viewed in FIGURE 6, a progressive angular turning movement of the bar 124 occurs in a clockwise direction until the intermediate section 136 of the continuous cam rail 132 is attained at which the bar 124 is disposed substantially parallel to the direction of travel of the carriage. As will be noted, the cam roller 126b passes into engagement with the second portion of the cam track upon passing in clearance relationship through the gap between the adjacent ends of the cam rail sections 134 while at the same time the cam roller 126a emerges from engagement and passes outwardly of the cam track. Upon subsequent movement of the carriage toward the right, as viewed in FIGURE 6, further angular movement of the bar 124 in a clockwise direction occurs until it attains the end position as viewed at the right of FIGURE 6, in which it is again disposed perpendicular to the longitudinal axis of the machine frame. As a result of the transfer movement of the carriage between one station and the other station, a rotation of the bar as well as the work supporting assembly affixed thereto through an angularity of 180° occurs. During the reverse movement of the carriage from a position at the right as viewed in FIGURE 6, to the position at the left thereof, a reversal in direction of rotation of the bar occurs in the same manner as previously described but in a counterclockwise direction.

It will be appreciated by those skilled in the art that the specific configuration of the cam track can be varied as well as in the cam follower arrangement employed to achieve any desired angular rotation of the work supporting assembly. The specific cam track illustrated is composed of series of straight sections which provides for a substantial simplification in the fabrication thereof. It will be understood, however, that arcuately contoured cams can be employed so as to vary the angular acceleration and deceleration of the work supporting assembly during the course of the travel of the carriage between the positions. Similarly, the cams can be arranged so as to provide a rotation of the work supporting assembly through an angularity of less than 180°, as may be desired or necessary, to obtain appropriate alignment between the rail segment on the work supporting assembly and the rails of the adjacent conveyor systems.

As hereinbefore set forth, it is also contemplated within the scope of the present invention that appropriate vertical movement of the work supporting assembly can be achieved in response to the rotation of the work supporting assembly to compensate for variations in the elevation of adjacent conveyor rails between which the work racks are being transferred. In accordance with the alternative embodiment of the present invention as illustrated in FIGURES 7–9 inclusive, a controlled vertical movement of the rail segment is achieved by means of coacting means extending between the rail segment and the carriage effecting thereby a mechanically coordinated ascending or descending movement of the rail segment in response to the rotation and translation of the transfer mechanism.

Referring now in detail to FIGURES 7–9, it will be noted that the transfer mechanism is substantially identical to that previously described in connection with FIGURES 1–6, with the exception that the work supporting assembly has been modified to provide for vertical movement of the rail segment. In all other respects, the work transfer mechanism is identical and for this reason like components have been designated by the same numeral with a prime affixed thereto. The arrangement as shown in FIGURES 7–9 also is directed to a work supporting assembly adapted to rotate through an angularity of 180° and it will be appreciated that the further embodiment as shown, is equally applicable to transfer devices wherein angularities of less than 180° are employed. As shown in FIGURES 7 and 8, the carriage 56' movably mounted on rails 54' affixed to the frame 44' includes the platform 58' on which a circular ramp or cam 140 is stationarily affixed which is adapted to coact with a roller 142 affixed to and projecting rearwardly of a bracket 144 depending from a cross member 146. The cross member 146 extends between and is affixed to the lower ends of a pair of vertical slide members 148 which are slidably disposed at the upper and lower portions thereof in slide bearings 150 affixed to the upright columns 118' of the work supporting assembly. On the upper ends of the slide members 148 arms 122' are affixed and to the outer ends of which the rail segment 30' is mounted.

In accordance with this arrangement and in the position as shown in solid lines in FIGURES 7 and 8, the weight of the work rack on the rail segment 30' is supported by the roller 142 resting on the ramp 140. In this position the rail segment 30' is at the lowermost position and in alignment with a rail of one of the conveyor systems. Upon subsequent movement of the carriage from the position as shown in FIGURE 7 toward the left accompanied by a corresponding rotation of the work supporting assembly in a counterclockwise direction as viewed in FIGURE 9 and through an angularity of 180° effects movement of the roller 142 upwardly along the ramp 140 to a position as shown in phantom in FIGURES 7 and 9. By virtue of the angularity of the ramp 140, a progressive lifting movement of the roller 142, the slide members 148, and the rail segment 30' affixed to the upper ends thereof occurs whereby upon attaining the other station the rail segment is vertically displaced from its original position by a distance corresponding to the difference in the height of the roller, as shown in solid lines and in phantom in FIGURE 7.

While the cam or ramp 140, as shown in FIGURES 7–9, is of a constant pitch, it will be appreciated that variations in the pitch along the length thereof, can be achieved so as to provide for a desired acceleration and deceleration in the ascending and descending movement of the rail segment 30' and the work rack suspended therefrom, to avoid any undue stresses to be imposed on the mechanical components thereof and to minimize swinging movement of the work rack. It will also be appreciated that the ramp 140 can be adjustably mounted relative to the platform 58' of the carriage enabling adjustment of the rise provided thereby consistent with the variation in elevation between the two adjoining conveyor rails to be serviced by the transfer mechanism. In accordance with the foregoing arrangement, lifts as small as a fraction of an inch can be imposed on the rail segment 30 to lifts substantially greater in response to an increase in the angularity of the ramp 140.

It will be understood by those skilled in the art that the work transfer mechanism comprising the present invention as herein described and as illustrated in the drawings, is shown with the frame disposed contiguous to the floor or base extending between two conveyor systems. It is also contemplated within the scope of the present invention that the transfer mechanism as shown can be inverted whereby the frame 44 is suspended from an overhead supporting structure and wherein the work supporting means including the upright columns 118 depend from the base 110 of the carriage and wherein the rail segment 130 is inverted from the position as shown for suspending work racks therefrom which extend in a direction opposite from those as illustrated in the drawings. A variation of the foregoing type can be made within the scope of the present invention consistent with an appropriate reversal of components as required to adapt the transfer mechanism to alternative plant conveyor system configurations as may be desired.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A work transfer mechanism for transferring work racks between two spaced stations comprising a frame, a carriage movably and guidably mounted on said frame for travel between two spaced stations, drive means for moving said carriage between said stations, work rack supporting means rotatably mounted on said carriage and movable therewith, and cooperating means on said work supporting means and said frame disposed in continuous engaging relationship in all moved positions of said carriage for locking said supporting means against inadvertent rotation when stationarily disposed at either of said two spaced stations and for rotating said supporting means about an upright axis between a first position when disposed at one station and a second position angularly spaced from said first position when disposed at the other station in response to at least a portion of the travel of said carriage between said stations.

2. The transfer mechanism as described in claim 1, wherein said work rack supporting means includes a rail segment for supporting a work rack and wherein said rail segment is adapted to be disposed in alignment with a supporting rail disposed at each of said stations to and from which the work rack is transferred.

3. The transfer mechanism as described in claim 1, wherein said frame includes rail means thereon and said carriage is movably and guidably mounted on said rail means.

4. The transfer mechanism as described in claim 1, wherein said cooperating means includes a stationary cam on said frame and a cam follower on said supporting means coacting with said cam for effecting rotation of said supporting means in response to the travel of said carriage.

5. The transfer mechanism as described in claim 1, wherein said carriage includes a platform and said supporting means comprising a base rotatably supported on said platform and including an upright framework having engaging means on the upper portion thereof for suspending a work rack therefrom.

6. The transfer mechanism as described in claim 1, further characterized as including sensing means for sensing the arrival of said carriage at said stations and for disenabling said drive means.

7. The work transfer mechanism as described in claim 1, wherein said drive means comprises a pair of spaced apart members rotatably mounted at opposite end portions of said frame, a flexible element trained about said members and having one flight thereof connected to said carriage, and means for reversibly and rotatably driving one of said members to effect reciprocating movement of said flexible element and corresponding reciprocating travel of said carriage between said stations.

8. A work transfer mechanism for transferring work racks between two spaced stations comprising a frame, a carriage movably and guidably mounted on said frame for travel between two spaced stations, drive means for moving said carriage between said stations, a framework rotatably mounted on said carriage and movable therewith, a work rack support guidably mounted for up and down movement on said framework, first cooperating means on said frame and said framework for rotating said framework about an upright axis between a first position when disposed at one station, and a second position angularly spaced from said first position when disposed at the other station in response to at least a portion of travel of said carriage between said stations, and second cooperating means on said work rack support and said carriage for moving said support relative to said framework between a first location and a second location vertically spaced from said first location in response to at least a portion of the rotating movement of said framework.

9. The transfer mechanism as described in claim 8, wherein said work rack support includes a rail segment for suspending a work rack therefrom and wherein said rail segment is adapted to be disposed in alignment with a first support rail when at said one station and a second support rail at an elevation different from said first support rail when disposed at said other station.

10. The transfer mechanism as described in claim 8, wherein said first and said second cooperating means comprise coacting cam and cam follower means.

References Cited
UNITED STATES PATENTS

| | | | |
|---|---|---|---|
| 2,292,763 | 8/1942 | Lennox | 104—48 |
| 2,633,809 | 4/1953 | Robinson | 104—48 |
| 2,958,331 | 11/1960 | Borodin | 104—48 |

ARTHUR L. LA POINT, *Primary Examiner.*

D. F. WORTH, *Assistant Examiner.*